Oct. 6, 1970   R. A. FOERSTNER   3,531,950
FRICTION DRIVE FOR SLOW SPEED MOTOR
Filed Sept. 17, 1968

INVENTOR.
RICHARD A. FOERSTNER
BY
ATTORNEY

United States Patent Office 3,531,950
Patented Oct. 6, 1970

3,531,950
FRICTION DRIVE FOR SLOW SPEED MOTOR
Richard A. Foerstner, Iowa City, Iowa, assignor to Amana Refrigeration, Inc., Amana, Iowa, a corporation of Delaware
Filed Sept. 17, 1968, Ser. No. 760,302
Int. Cl. F16d 7/02; H05b 9/06
U.S. Cl. 64—30                                     2 Claims

ABSTRACT OF THE DISCLOSURE

A friction drive arrangement for a motor operating at a low r.p.m. which arrangement reduces the starting torque on the motor so that a motor of relatively low power can be utilized for the drive. The arrangement utilizes a connecting arrangement between the driven member and the motor drive shaft which allows the driven member to slip on the shaft during the start-up.

BACKGROUND OF THE INVENTION

There are many applications in which small horsepower motors are needed. In most of these applications, the cost is a factor and keeping the cost to a minimum is essential. In many such applications, very little power is required of the motor once the starting torque has been overcome. Thus, an extremely inexpensive low horsepower motor could be utilized if the initial starting torque can in some manner be reduced. The devices of the prior art are too complex and thus too expensive for many applications where the problem of reducing starting torque exists.

SUMMARY OF THE INVENTION

Applicant's invention provides a very simple, inexpensive arrangement for interconnecting the drive shaft of a small motor and the driven member. The invention applies to applications where a positive connection between the motor and driven member is not necessary and even undesirable. The invention provides a means for assuring that some slippage will occur between the driven member and the motor drive shaft during the time the motor is accelerating, but the friction between the driven member and the drive shaft will be sufficient to cause the driven member to rotate once the motor has reached its rated speed. The arrangement of the invention also provides for adjusting the amount of force, and thus the friction, between the driving and driven members.

DESCRIPTION OF THE PREFERRED EMBODIMENT

Figure 1:
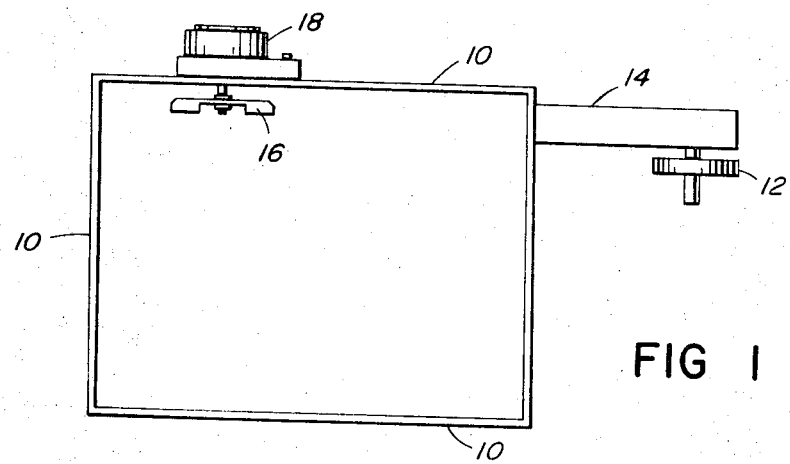
FIG. 1 is a side elevational view of an apparatus which utilizes a motor employing the principles of my invention.
Figure 2:
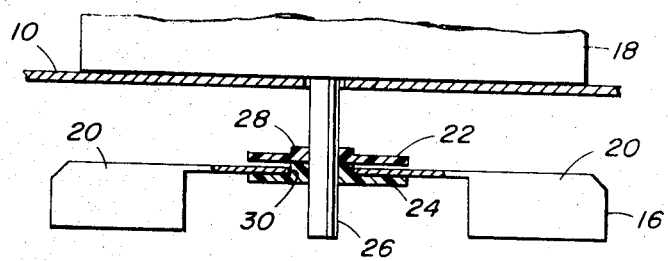
FIG. 2 is an enlarged elevational view, partly in section, and illustrating a preferred embodiment of an arrangement for interconnecting the motor drive shaft and the driven member.

In FIG. 1 there is illustrated an apparatus in which a motor driven fan-like device is used, the interconnection between the motor and the fan-like device being such that the principles of my invention can be utilized. The apparatus of FIG. 1 illustrates an oven which uses microwaves to cook food. The oven has walls 10 which provide an enclosure in which the food to be cooked is placed. A microwave generator 12 produces the microwaves which are transmitted through a wave guide 14 into the interior of the oven enclosure formed by walls 10. As is well known to those skilled in the art, microwaves can be reflected in the same manner as light waves. It is desirable in a microwave oven to "stir" the microwave energy in order to distribute the same more evenly throughout the oven and thus more evenly heat the food. This is done by what is commonly referred to as a "stirrer," as more fully explained and described in U.S. Pat. 2,618,735, for example. In FIG. 1, the stirrer 16 extends within the oven cavity formed by the walls 10 and is rotatably driven by a motor 18 outside of the cavity. As best seen in FIG. 2, the stirrer 16 is a fan-like device consisting of two or more blades 20 extending radially outward from their axis of rotation. Each of the blades is oriented in a vertical plane so that when the stirrer 16 is rotated, microwaves transmitted through wave guide 14 will strike the blades 20 and be reflected toward one of the walls 10 from which it will again be reflected until it is absorbed by the food to be cooked within the oven cavity.

The power that is required to drive the stirrer 16 depends, of course, on the mass of the stirrer and the speed at which the stirrer is rotated. In the past, the horsepower of the motor 18 was sized for the torque required to accelerate the stirrer from a standstill to its rated speed. As a result of the starting torque which must be overcome, stirrer motors have been larger than required to actually maintain the relatively slow rotation of the stirrer. The arrangement shown in FIG. 2 minimizes the starting torque required, and by making the stirrer 16 of a lightweight material and rotating it at a very slow speed very little power is required from the motor 18 and it can be correspondingly sized.

The arrangement illustrated in FIG. 2 consists basically of two clutch washers 22 and 24. The drive shaft 26 of the motor 18 is preferably made of a plastic material. Also, clutch washers 22 and 24 are preferably made of a plastic material and are identical. Each of the washers 22 and 24 has a small circular hub 28, the outer diameter of which is slightly smaller than the diameter of a circular hole 30 formed centrally in the stirrer 16. The upper clutch washer 22 is first pressed onto the drive shaft 26 and then the lower clutch washer 24, with its hub 28 extending into the opening 30 of the stirrer 16, is also pressed onto the drive shaft 26 until the hub 28 of the lower washer 24 abuts the upper washer 22. The thickness of the stirrer 16 in its central portion around opening 30 is approximately the same as the distance that the hub 28 extends above the main body of the washer. Thus, depending on the relative axial position of the washers 22 and 24, the surfaces of the stirrer 16 will be frictionally engaged with the top surface of the washer 24 or the bottom surface of washer 22 or both. When the washers 22 and 24 and the stirrer 16 are in assembled condition as shown in FIG. 2, the stirrer 16 is thus not held tightly between the washers 22 and 24, and can be turned relative to the washers. The amount of force required to cause the stirrer 16 to move when the washers 22 and 24 are rotated depends in part upon the relative position of the washers and how tightly they squeeze the stirrer 16.

In operation, when the motor 18 is started, there will be little or no starting torque because the stirrer 16 will slip with respect to the washers 22 and 24. As the speed of the motor 18 increases and approaches a constant speed, however, the friction between the upper surface of washer 24 and in some cases the lower surface of washer 22 and the stirrer 16 will increase to a point where it is sufficient to overcome any resistance to the turning of the stirrer and the stirrer will thus start to rotate. Thus, the power of the motor 18 need only be sufficient to drive the stirrer at the desired speed. Obviously, the arrangement is extremely simple and thus is very inexpensive to manufacture. The interconnection between the stirrer 16 and the drive shaft 26 of the motor depends primarily upon the frictional force between the stirrer and the lower washer 24. Since the drive shaft of the motor is vertically oriented, the weight of the stirrer 16 will assist in increasing the frictional force necessary to drive the stirrer subsequent to the initial start up.

It will be obvious to those skilled in the art that various provisions and modifications can be made in the embodiment shown herein without departing from the spirit and scope of the invention. It is my intention, however, that all such revisions and modifications as are obvious to those skilled in the art will be included within the scope of the following claims.

I claim:

1. A friction drive for a lightweight, motor driven mode stirrer in a microwave oven cavity, said motor having a depending drive shaft disposed in said cavity, said stirrer having a horizontal central portion with an opening therethrough through which said drive shaft extends and upper and lower horizontal friction surfaces around said opening, said drive comprising: a pair of identical washers having a press fit on said drive shaft and disposed above and below said stirrer friction surfaces to support and maintain said stirrer on said shaft, each of said washers having a horizontal friction surface engaging respective ones of said stirrer friction surfaces to provide sufficient friction therebetween to cause said stirrer to rotate when said drive shaft is rotated at a substantially constant speed but insufficient to cause said stirrer to rotate when said drive shaft is initially accelerated from standstill.

2. The drive of claim 1 wherein each of said washers is provided with a hub portion, the hub portion of the lower of said washers upstanding from the upper friction surface thereof and having an axial extent substantially equal to the thickness of the central portion of said stirrer, said hub portion being disposed in said stirrer opening.

References Cited

UNITED STATES PATENTS

| | | | |
|---|---|---|---|
| 595,291 | 12/1897 | Dwiggins | 64—30 XR |
| 2,132,765 | 10/1938 | Stoekle. | |
| 2,156,047 | 4/1939 | Arnold et al. | 64—30 |
| 2,974,503 | 3/1961 | Newton. | |

ALLAN D. HERRMANN, Primary Examiner

U.S. Cl. X.R.

219—10.55